(12) United States Patent
Mauter

(10) Patent No.: US 10,059,224 B2
(45) Date of Patent: Aug. 28, 2018

(54) TERMINAL DEVICE FOR AN ELECTRIC SYSTEM OF A VEHICLE AND METHOD FOR OPERATING SAME USING A WIRELESS KEY

(71) Applicant: Audi AG, Ingolstadt (DE)

(72) Inventor: Gerhard Mauter, Kösching (DE)

(73) Assignee: Audi AG, Ingolstadt (DE)

( * ) Notice: Subject to any disclaimer, the term of this patent is extended or adjusted under 35 U.S.C. 154(b) by 61 days.

(21) Appl. No.: 14/899,069

(22) PCT Filed: Jan. 16, 2014

(86) PCT No.: PCT/EP2014/000109
§ 371 (c)(1),
(2) Date: Dec. 16, 2015

(87) PCT Pub. No.: WO2014/202162
PCT Pub. Date: Dec. 24, 2014

(65) Prior Publication Data
US 2016/0129800 A1    May 12, 2016

(30) Foreign Application Priority Data

Jun. 19, 2013   (DE) .......................  10 2013 010 283

(51) Int. Cl.
*B60L 11/18* (2006.01)
*B60R 25/01* (2013.01)

(52) U.S. Cl.
CPC ....... *B60L 11/1883* (2013.01); *B60L 11/1818* (2013.01); *B60R 25/01* (2013.01);
(Continued)

(58) Field of Classification Search
CPC .................................................. B60L 11/1838
See application file for complete search history.

(56) References Cited

U.S. PATENT DOCUMENTS 9,444,187 B2 *   9/2016   Kojima ............... H01R 13/6397
9,718,368 B2 *   8/2017   Masuda .................. B60L 11/14
(Continued)

FOREIGN PATENT DOCUMENTS

DE     102009058263     8/2010
DE     102010030732     1/2012
(Continued)

OTHER PUBLICATIONS

Chinese Search Report dated Sep. 18, 2016 with respect to counterpart Chinese patent application 201480034688.3.
(Continued)

*Primary Examiner* — Robert Grant
*Assistant Examiner* — Tynese McDaniel
(74) *Attorney, Agent, or Firm* — Henry M. Feiereisen LLC

(57) ABSTRACT

In a method for operating an electric terminal device for an electric system of a vehicle for electrically connecting the electric system of the vehicle to an electric energy source arranged separately from the vehicle, a connection unit which is electrically connected to the electric energy source arranged separately from the vehicle is connected and locked to the terminal device. An unlocking procedure is carried out on the basis of a manual actuation of an actuation element of the terminal device of the vehicle when the connection unit is connected to the terminal device.

14 Claims, 1 Drawing Sheet

(52) U.S. Cl.
CPC ........ *Y02T 10/7005* (2013.01); *Y02T 10/7072* (2013.01); *Y02T 90/14* (2013.01)

(56) References Cited

U.S. PATENT DOCUMENTS

| | | |
|---|---|---|
| 9,731,611 B2* | 8/2017 | Kojima ............... B60L 11/1818 |
| 2009/0039110 A1 | 2/2009 | Brouwer |
| 2010/0156355 A1 | 6/2010 | Bauerle et al. |
| 2011/0294328 A1 | 12/2011 | Katagiri et al. |
| 2011/0300736 A1 | 12/2011 | Katagiri et al. |
| 2012/0083148 A1 | 4/2012 | Hirashita et al. |
| 2012/0186309 A1* | 7/2012 | Ishida ................... B60L 11/123 70/57 |
| 2012/0217278 A1 | 8/2012 | Bostrom et al. |
| 2012/0234061 A1 | 9/2012 | Inoue et al. |
| 2013/0009598 A1 | 1/2013 | Ohtomo |
| 2013/0015951 A1* | 1/2013 | Kuramochi ........ H01R 13/6397 340/5.64 |
| 2013/0089999 A1 | 4/2013 | Martin |

FOREIGN PATENT DOCUMENTS

| | | |
|---|---|---|
| DE | 102010048713 | 4/2012 |
| DE | 102012105660 | 1/2013 |
| DE | 102012217278 | 4/2013 |
| JP | 2008-536678 | 9/2008 |
| KR | 10-2012-0008201 | 1/2012 |
| WO | WO 2012/163639 | 12/2012 |

OTHER PUBLICATIONS

Translation of Chinese Search Report dated Sep. 18, 2016 with respect to counterpart Chinese patent application 201480034688.3.
International Search Report issued by the European Patent Office in International Application PCT/EP2014/000109 dated Oct. 22, 2014.

* cited by examiner

TERMINAL DEVICE FOR AN ELECTRIC SYSTEM OF A VEHICLE AND METHOD FOR OPERATING SAME USING A WIRELESS KEY

CROSS-REFERENCES TO RELATED APPLICATIONS

This application is the U.S. National Stage of International Application No. PCT/EP2014/000109, filed Jan. 16, 2014, which designated the United States and has been published as International Publication No. WO 2014/202162, and which claims the priority of German Patent Application, Serial No. 10 2013 010 283.9, filed Jun. 19, 2013, pursuant to 35 U.S.C. 119(a)-(d).

BACKGROUND OF THE INVENTION

The present invention relates to a terminal device for an electric system of a vehicle, which terminal device is arranged for electrically coupling the electric system of the vehicle with a connection unit of the vehicle that is arranged separate from the vehicle and electrically connected with an electrical energy source and that has a locking means, by means of which the connection unit can be locked when connected with the terminal device. Moreover, the invention relates to a vehicle with an electric system and to a method for operating an electric terminal device for an electric system of a vehicle for electrically coupling the electric system of the vehicle with an electrical power source arranged separate from the vehicle, for which purpose a connection unit that is electrically connected with the electrical power source and is arranged separate from the vehicle is connected with the terminal device and locked.

In motor vehicles that are at least partially, in particular predominantly driven electrically, a vehicle battery, which provides the required electrical power for a driving operation of the vehicle, is charged via an electrical outlet on the vehicle, to which a plug connected to a public power grid can be connected. When not in the driving state, the vehicle can be charged in this manner in the idle state, so it is preferably fully charged for subsequent intended uses.

Vehicles of the generic type are in particular motor vehicles that can be driven at least partially by means of an electric drive, such as electric vehicles, hybrid vehicles or the like.

A charging process is performed, depending on the type of the motor vehicle, by inserting a non-lockable charging plug into the charging socket or the charging receptacle of the vehicle whereupon, for example, the charging process is started immediately. However, the use of non-lockable vehicle connectors enables misuse by third parties, especially when the vehicle is parked. For this reason, a locking means is usually provided, which mechanically locks the charging plug when plugged into the charging socket, thereby making it more difficult for unauthorized third parties to separate the charging plug from the charging socket. The locking means may include retaining claws, latching lugs or the like, which can be operated for unlocking only from inside the vehicle.

Moreover, such vehicles may have a timer which, due to program control, allows making the vehicle available to the user at a programmed departure time charged and air conditioned. The timer can be programmed, for example, with respect to charge settings and the selection or change of a charging mode, such as immediate charging, timer-controlled charging or the like can be carried out via an infotainment device or even via a combination device. Furthermore, apps for smartphones may be provided.

A charging process is then generally started, terminated or canceled by making or breaking the connection between the connector and the charging socket or receptacle. In addition, a charging process can be interrupted by means of the infotainment- and/or apps-applications.

Disadvantageously, it has been found that to terminate or cancel a charging process in conjunction with a lockable charging plug, the user must first enter the vehicle in order to unlock the plug inside the vehicle. The user must then again exit the vehicle to remove the plug from the charging socket or the charging receptacle. The user must therefore perform an annoying entry and exit process in order to make the vehicle ready for driving.

It is likewise disadvantageous to have the user perform an entry and exit process when switching between timer-controlled charging and immediate charging.

The use of a mobile radio terminal, in particular a smartphone app executable by the mobile radio terminal for unlocking or changing the charging program, has proven unreliable because—depending on the vehicle's location—a radio-based communications link may be unreliable, so that the desired function cannot be performed. In addition, there is a risk that an accidental misuse can cause unintentional unlocking. This would be associated with the termination of the charging process, so that the vehicle would not be properly charged. Moreover, this creates opportunities for misuse by third parties.

US 2012/0083148 A1 discloses a locking device for a power supply connector.

US 2011/0294238 A1 describes a connector locking device.

DE 10 2012 217 278 A1 discloses a locking device for an electric vehicle charging connector.

It is thus the object of the invention to improve on the aforementioned problems.

SUMMARY OF THE INVENTION

According to one aspect of the invention, a method of operating an electric terminal device for an electric system of a vehicle for electrically coupling the electric system of the vehicle with an electrical energy source arranged separate from the vehicle includes, electrically connecting a connection unit with the electrical energy source arranged separate from the vehicle with the terminal device and locking the same, unlocking the above connection between the connection unit and the terminal device by manually actuating an actuating element of the terminal device of the vehicle when the connection unit is connected with the terminal device, and checking in response to a manual actuation of the actuating element of the terminal device whether an authorized wireless key is in communication range of the vehicle. According to another aspect of the invention, a terminal device for an electric system of a vehicle is configured to electrically couple the electric system of the vehicle with a predetermined connection unit that is electrically connected to an electric power source arranged separate from the vehicle and includes locking means for locking the connection unit when connected with the terminal device. According to yet another aspect of the invention, a vehicle has an electric system to which the aforedescribed terminal device is connected.

With respect to the process flow, the invention proposes in particular that unlocking is performed by manually actuating an actuating element of the terminal device when the connection unit is connected to the terminal device.

According to the invention, the terminal device is provided with an actuating element which can be manually operated by the user. When needed, one, two or more actuating elements may be provided. Preferably, the actuating element is arranged in close proximity to the terminal device, so that the user can both actuate the actuating element and connect the connection unit to the terminal device without having to change his location. The terminal device may, for example, be a connector socket, a receptacle, a plug-in connector, but also a plug, or like or similar combinations thereof. The terminal device is preferably disposed in or on an outer skin of the vehicle so that it is easily accessible and operable by the user from outside the vehicle. Locking can preferably occur automatically upon connection between the terminal device and the connection unit. In particular, locking can be automatic. Of course, in addition, locking may also be accomplished by actuating the actuating element. The user then no longer needs to enter the vehicle to perform locking or unlocking. He can do this sequentially when making or breaking the connection between the charging plug and the charging socket, without having to change his location.

It will be understood that the invention can not only be used in land vehicles, such as motor vehicles, especially passenger cars, trucks or the like, but also in marine vessels or aircrafts.

The electric power source arranged separate from the vehicle is a vehicle-external power source, such as a public power grid, a fixed or mobile, stationary generator, a fuel cell, a solar cell array, a wind turbine, a battery, or combinations thereof, and the like. The connection unit is preferably formed complementary to the terminal device to attain a simple, reliable connection. In addition, of course, connecting means may be provided, which serve to connect the connection unit to the terminal device, such as a drive that guides the connection unit to and retains the connection unit in the terminal device in the connected state, or the like. Locking can be accomplished by using locking means, which in particular allow a mechanical interlock and prevent unauthorized connecting and/or unauthorized disconnecting of the connection. To this end, the connection between the connection unit and the terminal device is thus a releasable connection. Preferably, the connection between the connection unit and the terminal device is used for charging a vehicle's energy storage device, which provides the electrical power for the normal operation of the vehicle, in particular in the driving state.

The actuating element may be formed, for example, by an electromechanical component such as a switch, a button, or combinations thereof or the like. Moreover, the actuating element may also include an electronic sensor that detects a manual operation, for example actuating elements based on capacitive or optical sensors, biometric sensors, combinations thereof, or the like. Different actuating elements may be provided for locking and unlocking; preferably, however, the locking means are both locked and unlocked with a single actuating element. The actuating element may for example be configured as an electromechanical or electronic component, which is in communication with a vehicle-BUS. Similarly, the locking means may be controlled via the vehicle-BUS. A control unit of the vehicle that is also in communication with the vehicle-BUS may be configured to detect the actuation of the actuating element and transmit a corresponding control command to the locking means.

Particularly advantageously, the terminal device and the actuating element form a common structural unit to which the vehicle-BUS and the electric system of the vehicle are connected. The electric system of the vehicle includes, in addition to the aforementioned energy storage device of the vehicle, other electrical devices of the vehicle, such as illumination devices, in particular vehicle lights for driving, an electrically powered air conditioning system, interior car lights, vehicle steering and/or more. In addition, the electric system of the vehicle includes in particular at least one electric drive, which enables or at least supports a desired driving operation of the vehicle. Of course, aside from the electric drive, which can be formed for example by a rotating electric machine or the like, an internal combustion engine or the like may be additionally provided.

Accordingly, the terminal device according to the invention is configured to carry out the method of the invention.

Therefore, a vehicle according to the invention is equipped with an electric system to which a terminal device of the invention is connected.

According to an embodiment of the invention, it is proposed that a charging process of an energy storage device of the vehicle is controlled by manually actuating the actuating element. For example, the energy storage device of the vehicle may be charged immediately when the user actuates the actuating element. In addition, the charging process may also be interrupted by the actuation of the actuating element. Of course, a separate actuating element may also be provided for this purpose so that the charging process can be started or interrupted, and the locking or unlocking can be performed separately from one another.

Furthermore, a vehicle-BUS may be activated by manually actuating the actuating element. This function is based on the understanding that the vehicle is usually charged in the idle state, for example, when the vehicle is shut off, especially parked. In this state, the vehicle-BUS need not be active. As soon as charging begins, the vehicle-BUS can be deactivated, in particular when the vehicle is locked, in order to increase the safety and also save energy. The vehicle-BUS can be activated through actuation of the actuating element by the user, so that the user can activate the desired function by manually actuating the actuating element. In particular, it may be necessary to bring the vehicle in the unlocked state for activating the vehicle-BUS.

Accordingly, in one embodiment, the activation is only released in the unlocked state of the vehicle. The vehicle-BUS can then only be activated when the car has previously been unlocked. The vehicle-BUS is then deactivated in the locked state, which not only saves energy, but makes unauthorized manipulation by a third party more difficult. In particular, it is proposed to deactivate the actuating element when the vehicle is locked.

According to one embodiment of the invention, a charging process for the energy storage device is automatically activated when locking the vehicle. This allows both locking the vehicle and activating the charging process with a single actuation by the user.

According to one embodiment, the vehicle-BUS is activated after completion of the charging process by manually actuating an actuating element, in particular the actuating element of the terminal device. When the charging process is terminated, although the charging plug is still plugged into the charging socket, the vehicle-BUS may therefore be deactivated, at the latest after the completion of the charging process. The vehicle-BUS can be activated again by actuating the actuating element, so that a desired function can be performed in response to user operation of the actuating element. If the vehicle is at rest and the energy storage device of the vehicle is charged, then the charging process can be terminated by manually actuating the actuating element of the terminal device, if it is determined that the energy storage device is indeed charged. For example, the actuating element can in this way be provided with two functions, such as starting the immediate charging after establishing the lock and the second function that is selectable during the charging process by manually actuating the actuating element. In addition, the locking means may also be unlocked at the same time when the charging process is completed, allowing the connection between the connection unit and the terminal device to be released.

In addition, a timer for controlling the charging process of the energy storage device may be activated, for example, by manually actuating the actuating element. The timer may be composed of, for example, a timer, a programmed electronic timer, combinations thereof, or the like. Preferably, the timer is programmable, so that the user or a manufacturer can specify at least one parameter for the charging process. Parameters may be, for example, a charging time, a start of the charging process and an end of the charging process, a charging current, a charging characteristic or the like. Preferably, the selected parameter is matched to the electrical energy storage device of the vehicle. Manual actuation of the actuating element can activate the programmed timer to control the charging process, instead of charging immediately. However, the type of actuation of the actuating element may also either activate the timer or direct charging. This can for example be achieved by actuating the actuating element several times in succession, with the number of operations allowing a selection with respect to the desired control.

Furthermore, when the timer is activated, a timer-controlled charging process may be carried out automatically when the connection unit is connected to the terminal device. The charging process can then be performed automatically and user-specific.

In particular, the charging process may be terminated and the connection between the connection unit and the terminal device may be unlocked by manually actuating the actuating element of the terminal device. In this way, the timer-controlled charging process may be interrupted or canceled, when for example the user wants to have the vehicle available immediately, although the charging process with the timer is not yet completed.

According to a further embodiment, in a timer-controlled charging process and an active vehicle-BUS, the charging process can be continued without timer control in response to a manual actuation of the actuating element of the terminal device. This function makes it possible to switch from a timer-controlled charging process in a non-timer controlled charging process. Of course, a separate actuating element may be provided for this purpose which in addition may also allow switching between a timer-controlled charging process and a non-timer-controlled charging process.

An advantageous embodiment of the invention relates to the use of wireless keys, especially in conjunction with the function "keyless entry". It is thus proposed by the invention to check in response to a manual actuation of the actuating element of the terminal device, whether an authorized wireless key is in communication range of the vehicle. The user then does not need to unlock the vehicle, but it can be checked solely based on the fact that the user with his wireless key is in communication range of the vehicle and that this key has a valid authorization which allows for example control of the vehicle, whether the authorization in the form of the encrypted code of the wireless key is valid. The function is executed in response to the actuation of the actuating element in the desired manner only when a valid authorization is present.

In addition, the vehicle-BUS may be activated with a valid authorization. Preferably, the vehicle-BUS is only activated when the wireless key with a valid authorization is within the communication range of the vehicle. When the key leaves the communication range of the vehicle, the vehicle-BUS may be automatically deactivated. The vehicle-BUS may be, for example, a CAN bus or the like.

According to the invention, the terminal device may be configured to perform the method of the invention. Accordingly, the terminal device may have an actuating element with which the locking means can be controlled. The arrangement of the actuating element on the terminal device, preferably in the region of the connection with a connection unit, allows the user, preferably without changing his position, to connect the connection unit with the terminal device and to at the same time also actuate the actuating element. Cumbersome additional entry and exit operations can thus be largely avoided. The predetermined connection unit can thus interact with the locking means when connected with the terminal device, thus achieving a preferably automatic locking in this state. The terminal device can be set up by way of a controller, in particular an electronic controller. The control can for this purpose include an electronic circuit and/or a program-controlled computer unit configured to perform the inventive method steps.

Moreover, the terminal device may include a second or a plurality of actuating elements configured to activate the one or more electrical functions. The electrical functions may represent, for example, immediately start charging, terminate charging, activating a timer control, others or the like.

In addition, the terminal device may include a display element associated with the actuating element. Preferably, a separate dedicated display element may be provided for each actuating element. The display element is preferably an optical display element in the form of light, such as an incandescent lamp, a light-emitting diode, a neon lamp, combinations thereof, or the like. The display element may also be controlled via the vehicle-BUS. Preferably, the display element displays the function that is activated or deactivated with the actuating element. In this way, the user receives feedback regarding his operation. In addition, the display element may display information only when the vehicle BUS is activated.

BRIEF DESCRIPTION OF THE DRAWING

Further advantages and features will become apparent from the following description of exemplary embodiments. In the figures, like parts are designated by like reference numerals. The description of the exemplary embodiments is intended only to illustrate the invention and is not intended to be limiting the invention.

It is shown in.

DETAILED DESCRIPTION OF PREFERRED EMBODIMENTS

Figure 1:
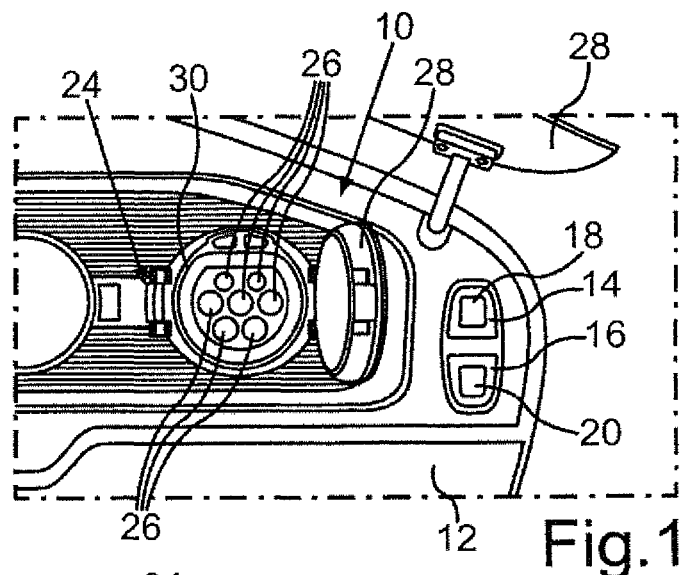
FIG. 1 a schematic partial diagram of a vehicle in the region of a charging socket according to the invention in a first embodiment, FIG. 2 schematically, a detail of a vehicle in the region of a charging socket according to a second embodiment of the invention with a mounted plug, and FIG. 3 a detail of a vehicle in a schematic diagram in the region of a charging socket according to a third embodiment of the invention.

FIG. 1 shows in form of a schematic partial diagram a charging socket 10 as a terminal device for an electric system of a vehicle 12 according to a first embodiment. The charging socket 10 is attached to an outer skin of the vehicle 12 and has a closure flap 28, by which the charging socket 10 can be closed while the vehicle 12 is driven. The charging socket 10 is thus protected while driving. The vehicle 12 is an electric vehicle or a hybrid vehicle, which includes a complementary electric drive in addition to an internal combustion engine. The electric system, which is required for the electrical functions of the vehicle 12, is not shown in the figures. However, the electric system includes, aside from an electric machine which may be configured as a rotating electrical machine, an electrical energy storage device which may be configured for example as a battery, a capacitor, combinations thereof or the like. In addition, a controller is provided which controls the operation of the electric machine by way of an inverter. In addition, the controller may also perform other functions, for example in relation to charging the electrical energy storage device. The electric system may also include other functions such as vehicle lighting, vehicle heating, air conditioning or the like.

As evident from FIG. 1, the charging socket 10 has a plug-in region 30 with contact sleeves 26. The contact sleeves 26 are electrically connected to the electric system of the vehicle 12. The arrangement of the contact sleeves 26 provides a coding, allowing a plug 22 (FIG. 2) to be connected to the charging socket 10 in only a single plug-in position, by manually placing the plug 22 on the charging socket 10 when the closure flap 28 is in the open position. For this purpose, the plug 22 has respective contact pins, with which an electrical contact with the contact sleeves 26 can be established. The contact pins of the plug 22 that are not shown in the figures are connected via an electrical connecting cable with an electrical power source outside the vehicle 12, for example a public power grid. The number and arrangement of the contact pins 26 on the plug 22 may be selected in accordance with the type of electrical power supplied by the vehicle-external electrical power source.

The charging socket 10 serves to electrically couple the electric system of the vehicle 12 with the plug 22 that is connected to the electric power source arranged separate from the vehicle 12. The charging socket 10 further includes a locking unit 24 as a locking means, with which the plug 22 can be locked in the charging socket 10 in the connected state.

The charging socket 10 further includes buttons 14, 16 as actuating elements for controlling, on the one hand, charging processes and, on the other hand, for locking and/or unlocking the connector 22. The buttons 14, 16 each include a light emitting diode (LED) 18, 20 as a display element for function feedback.

The button 14 is marked as an immediate charging button and labeled with a plug symbol. The other switch 16 is intended as a timer charging button and is accordingly labeled with a clock icon or with a plug icon in combination with a clock icon.

In the present embodiment, the buttons 14, 16 are able to activate a vehicle-BUS of the vehicle 12, i.e., to wake the vehicle 12 when the BUS is at rest and the vehicle 12 is not locked. Conversely, the function of the buttons 14, 16 is deactivated when the vehicle 12 is locked, thereby largely preventing misuse by third parties.

Figure 2:
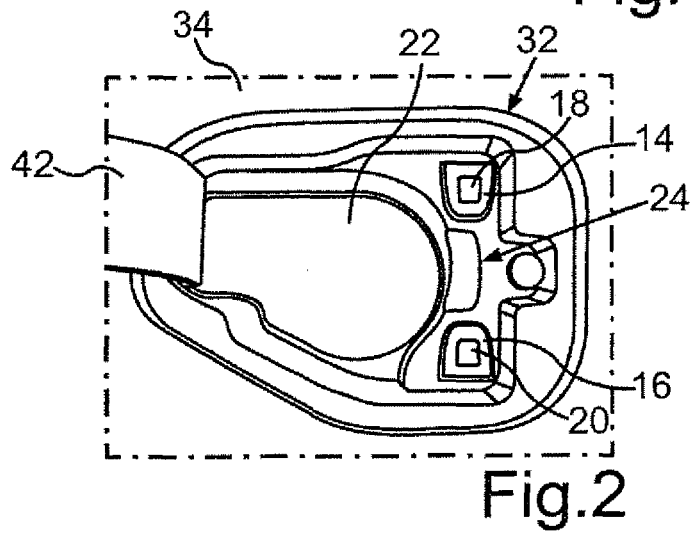

FIG. 2 shows a second embodiment of a charging socket 32 of a passenger car 34, which differs from the embodiment of FIG. 1 essentially only by the arrangement of the charging socket and the switches 14, 16. Reference is therefore made to the embodiment of FIG. 1 with respect to the components and their function. In this embodiment, the plug 22 is inserted and locked in the charging socket 32. A cable 42, which is connected to an unillustrated public power grid as energy source, is connected to the plug 22.

Figure 3:
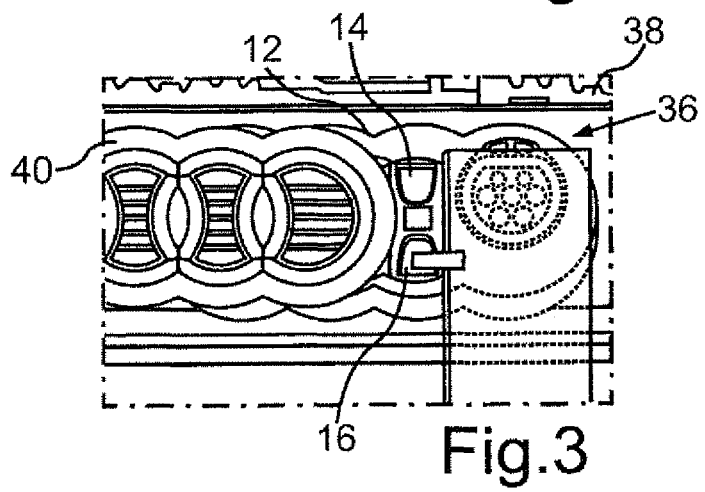

Another embodiment of a terminal device according to the invention is shown in FIG. 3. FIG. 3 illustrates a charging socket 36 of a passenger vehicle 38. The charging socket 36 includes the components and functions of the charging sockets of the preceding embodiments, so that reference is also made to the embodiments in FIGS. 1 and 2. Furthermore, the charging socket 36 is provided with a closure lid 40, which in unlike the closure flap 28 according to the embodiment of FIG. 1 does not swivel but can be displaced.

According to another exemplary embodiment, a functional logic may be provided as follows. If the plug 22 is inserted into the charging socket 10, 36, 32 when the timer is not programmed or deactivated, then a charging process is started immediately and automatically, and the LED 18 of the button 14 is switched on. This is done via an unillustrated vehicle control, which is in communication via the vehicle-BUS with the corresponding components and controls these components accordingly. If the plug 22 is plugged into the charging socket 10, 32, 36 and the charging process is started, then the locking unit 24 is automatically actuated at the same time, thereby locking the plug 22 in the inserted state. In this state, the plug 22 cannot be removed from the charging socket 10, 32, 36, which is indicated by illuminating the LED 18.

If the switch 14 is manually operated during the charging process, the charging process is interrupted and the plug 22 is unlocked by the locking unit 24 so that the plug 22 can be removed from the charging socket 10, 36, 32. Accordingly, the LED 18 of the button 14 is turned off.

If the button 16 is operated during an already started charging process, where the LED 20 is initially turned off in this state, the LED 20 briefly flashes to indicate to the user that this function is unavailable in the current operating state. No timer is programmed or the timer is inactive. In this case, the current charging process is not interrupted, and the plug 22 is not unlocked.

If charging is completed and the vehicle-BUS is deactivated, the LEDs 18, 20 are turned off accordingly. The vehicle-BUS can then be activated again by actuating one of the two buttons 14, 16, whereupon the LED 18 of the button 14 is switched on again. When the switch 14 is actuated again, the locking unit 24 is actuated, which then unlocks the plug 22, provided that the vehicle 12, 34, 36 is not locked. Thereafter, the LED 18 is turned off.

If the plug 22 is inserted in the charging socket 10, 32, 36 while the timer is programmed and/or not deactivated, a timer-controlled charging process starts automatically. The corresponding function feedback via the LED 20 is turned on. A manual actuation of the button 16 by the user during the charging process interrupts the charging process and operates the locking unit 24, whereupon the plug 22 is unlocked. The plug 22 can then be withdrawn, whereupon the LED 20 is turned off.

Operation of one of the two buttons 14, 16 after the end of the charging process, when the vehicle-BUS is deactivated, wakes the vehicle-BUS and turns the function feedback by the LED 20 on again. A renewed operation of the switch 16 causes unlocking of the plug 22 if vehicle 12, 34, 36 is not locked. The LED 20 is turned off.

If the button 14 is operated in the timer-controlled charging mode and the vehicle-BUS is active, i.e. if the LED 20 is illuminated, a changeover into the non-timer-controlled the charging mode takes place. The LED 20 is turned off and the LED 18 is turned on instead. A changeover to timer-controlled charging is carried out analogously.

If the vehicle 12, 34, 36 is locked, the vehicle must first be opened to activate the function of the buttons 14, 16. Since opening the vehicle 12 typically also activates the vehicle-BUS, the corresponding LED 18, 20 is automatically turned on. Thus, the aforementioned operations need not be reentered, which initially only activate the vehicle-BUS when the vehicle 12, 34, 36 in not locked.

Another embodiment of the invention relates to the use of wireless keys for vehicles in which a user does not need to operate the wireless key in order to open or close the vehicle. This function is often also referred to as "keyless entry". With the invention, the user can here also perform a desired actuation in the region of the charging socket 10, 32, 36, without having to operate in addition a key. In this case, the push button 14, 16 is constructed "key-capable", i.e. once the user with his wireless key reaches the communication range of the vehicle 12, 34, 36, the vehicle-BUS is activated and thus the buttons 14, 16 can be used.

The charging process may be started as described in relation to the preceding examples.

If the vehicle-BUS is deactivated and the vehicle is locked, it is checked in response to a manual actuation of the two buttons 14, 16 whether an authorized vehicle key is in communication range of the vehicle 12, 34, 36. In case of a positive check, the vehicle-BUS is activated and the corresponding LED 18, 20 is turned on. A renewed actuation of one of the two buttons 14, 16 leads to the corresponding function, as already described with reference to the previous embodiments, although the vehicle 12, 34, 36 remains initially locked.

A manual actuation of one of the two buttons 14, 16 in the locked state of the vehicle 12, 34, 36 with an activated vehicle-BUS—the corresponding LED 18, 20 is switched on—causes an immediate reaction, as described with reference to the previous embodiments, namely, for example, changing the charging mode between timer-controlled and directly charging or locking or unlocking of the plug 22.

In another exemplary embodiment, an automatic start of the charging process may additionally be omitted, depending on the programming of the timer. Instead, the user selects the charging mode by manually actuating one of the two buttons 14, 16 after the plug 22 is inserted into the charging socket 10, 32, 36. Only thereafter is the plug 22 locked with the locking unit 24 and the corresponding LED 18, 20 is switched on.

The aforedescribed exemplary embodiments are merely illustrative of the invention and are not limiting thereof. In particular, it will be understood that features and exemplary embodiments may be combined with one another as desired, in order to arrive at other appropriate embodiments without departing from the spirit of the invention.

The advantages and features described for the method according to the invention apply mutatis mutandis to the device according to the invention and to a vehicle equipped with the device.

The features and feature combinations mentioned above in the description and/or the features and feature combinations shown separately in the figures can be used not only in the particular indicated combination, but also in other combinations or alone without departing from the scope of the invention.

The invention claimed is:

1. A method of operating a terminal device for an electric system of a vehicle, comprising:
   electrically connecting a connection unit having an electric energy source arranged separate from the vehicle;
   connecting the connection unit with the terminal device and locking the connection unit with the terminal device by way of a locking device;
   unlocking the connection unit from the terminal device by manually actuating at least one of at least two actuating elements configured electromechanical or electronic components of a switch and a button of the terminal device of the vehicle in response to the connection unit being connected with the terminal device;
   wherein both of said two actuating elements configured to unlock the connection unit from the terminal device by manual actuation;
   providing a communication of the actuating elements with a vehicle-BUS;
   controlling the locking device via the vehicle-BUS for interacting with the connection unit, in response to the connection unit being connected with the terminal device;
   checking in response to the manual actuation of the at least one of the at least two actuating elements whether an authorized wireless key is in communication range of the vehicle; and
   activating the vehicle-BUS in response to the manual actuation of the at least one of the at least two actuating elements, with the activation of the vehicle-BUS being unblocked in response to the vehicle being unlocked.

2. The method of claim 1, wherein the vehicle-BUS is activated with a valid authorization.

3. The method of claim 1, wherein the manual actuation of the at least one of the at least two actuating elements controls a charging process of an energy storage device of the vehicle.

4. The method of claim 3, further comprising automatically activating a charging process for the energy storage device in response to locking the vehicle.

5. The method of claim 4, further comprising activating the vehicle-BUS after termination of the charging process by manually actuating the at least one of the at least two actuating elements.

6. The method of claim 1, further comprising activating a charging process of an energy storage device of the vehicle by controlling a timer.

7. The method of claim 6, further comprising automatically executing a timer-controlled charging process upon connection of the terminal device with the connection unit in response to activating the timer.

8. The method of claim 7, further comprising, in response to a manual actuation of the at least one of the at least two actuating elements, terminating the charging process and unlocking the connection of the connection unit with the terminal device.

9. The method of claim 6, further comprising continuing the charging process without timer control in response to a manual actuation of the at least one of the at least two actuating elements when the charging process is timer-controlled and the vehicle BUS is active.

10. A terminal device for an electric system of a vehicle, wherein the terminal device electrically connects the electric system of the vehicle with a connection unit that is electrically connected to an electric power source arranged separate from the vehicle, wherein the terminal device comprises a locking device which locks the connection unit with the terminal device in response to the connection unit being connected with the terminal device, said terminal device comprising:
- at least two actuating elements configured as electromechanical or electronic components of a switch and a button in communication with a vehicle-BUS, wherein both of said two actuating elements configured to unlock the connection unit from the terminal device by manual actuation;
- at least one of the said at least two actuating elements unlocking the connection unit from the terminal device in response to manual actuation of the at least one of the at least two actuating elements of the terminal device of the vehicle in response to the connection unit being connected with the terminal device;
- wherein the locking device is controlled via the vehicle-BUS for interacting with the connection unit, in response to the connection unit being connected with the terminal device,
- wherein it is checked in response to the manual actuation of the at least one of the at least two actuating elements whether an authorized wireless key is in communication range of the vehicle; and
- wherein the vehicle-BUS is activated in response to the manual actuation of the at least one of the at least two actuating elements, with the activation of the vehicle-BUS being unblocked in response to the vehicle being unlocked.

11. The terminal device of claim 10, wherein the locking device is controlled by the at least one of the at least two actuating elements.

12. The terminal device of claim 10, further comprising a display element associated with the at least one of the at least two actuating elements.

13. The method of claim 1, wherein the at least one of the at least two actuating elements is deactivated, in response to the vehicle being locked.

14. A vehicle comprising:
- an on board electric system,
- a terminal device connected to the onboard electric system, wherein the terminal device is configured to electrically connect the onboard electric system with a connection unit that is electrically connected to an electric power source arranged separate from the vehicle, wherein the terminal device comprises a locking device configured to lock the connection unit with the terminal device when the connection unit is connected with the terminal device, said terminal device comprising:
- at least two actuating elements configured as electromechanical or electronic components of a switch and a button in communication with a vehicle-BUS, wherein both of said two actuating elements configured to unlock the connection unit from the terminal device by manual actuation;
- at least one of the said at least two actuating elements unlocking the connection unit from the terminal device upon manual actuation of the at least one of the at least two actuating elements of the terminal device of the vehicle in response to the connection unit being connected with the terminal device;
- wherein the locking device is controlled via the vehicle-BUS for interacting with the connection unit, in response to the connection unit being connected with the terminal device,
- wherein it is checked in response to the manual actuation of the at least one of the at least two actuating elements whether an authorized wireless key is in communication range of the vehicle, and
- wherein the vehicle-BUS is activated in response to the manual actuation of the at least one of the at least two actuating elements, with the activation of the vehicle-BUS being unblocked in response to the vehicle being unlocked.

* * * * *